(12) United States Patent
Hohmann et al.

(10) Patent No.: US 10,838,117 B2
(45) Date of Patent: *Nov. 17, 2020

(54) REFLECTOR FOR VEHICLES

(71) Applicant: Hella KGaA Hueck & Co., Lippstadt (DE)

(72) Inventors: Carsten Hohmann, Warstein (DE); Martin Muegge, Geseke (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,037

(22) Filed: Jun. 12, 2017

(65) Prior Publication Data

US 2017/0276843 A1 Sep. 28, 2017

Related U.S. Application Data

(63) Continuation of application No. PCT/EP2015/078801, filed on Dec. 7, 2015.

(30) Foreign Application Priority Data

Dec. 10, 2014 (DE) .................. 10 2014 118 308

(51) Int. Cl.
*G02B 5/12* (2006.01)
*F21S 43/20* (2018.01)
(Continued)

(52) U.S. Cl.
CPC .............. *G02B 5/12* (2013.01); *B60Q 1/30* (2013.01); *F21S 43/00* (2018.01); *F21S 43/26* (2018.01);
(Continued)

(58) Field of Classification Search
CPC . G02B 5/12; G02B 5/203; G02B 5/32; G02B 5/136; G02B 5/124; G02B 5/18;
(Continued)

(56) References Cited

U.S. PATENT DOCUMENTS 5,455,747 A * 10/1995 Aoyama ............... B60Q 1/2607
362/545
5,571,277 A * 11/1996 Allred ................... B60Q 1/302
340/479

(Continued)

FOREIGN PATENT DOCUMENTS

DE 10047206 A1 6/2002
EP 0870655 A1 10/1998
(Continued)

OTHER PUBLICATIONS

International Search Report dated Feb. 9, 2016 in corresponding application PCT/EP2015/078801.

*Primary Examiner* — Stephone B Allen
*Assistant Examiner* — Adam W Booher
(74) *Attorney, Agent, or Firm* — Muncy, Geissler, Olds & Lowe, P.C.

(57) ABSTRACT

A reflector for vehicles includes a reflective surface that contains an optical element to reflect light incident on the optical element according to specific reflection characteristics. The reflective surface is designed as a hologram element which has a grating structure in such a way that light incident on the hologram element is reflected according to the specific reflection characteristics.

5 Claims, 6 Drawing Sheets

(51) Int. Cl.
*F21S 43/40* (2018.01)
*F21S 43/31* (2018.01)
*G02B 5/20* (2006.01)
*G03H 1/02* (2006.01)
*B60Q 1/30* (2006.01)
*G02B 5/32* (2006.01)
*F21S 43/00* (2018.01)
*G03H 1/22* (2006.01)

(52) U.S. Cl.
CPC ............. *F21S 43/315* (2018.01); *F21S 43/40* (2018.01); *G02B 5/203* (2013.01); *G02B 5/32* (2013.01); *G03H 1/0248* (2013.01); *G03H 1/2202* (2013.01); *G03H 2001/2231* (2013.01)

(58) Field of Classification Search
CPC ........ G02B 5/1861; F21S 43/00; F21S 43/26; F21S 43/315; F21S 43/40; F21S 43/20; F21S 43/30; F21S 43/31; B60Q 1/30; B60Q 1/32; B60Q 1/34; B60Q 1/44; G03H 1/0248; G03H 1/02; G03H 1/024; G03H 2001/2231; G03H 2001/2223; G03H 2001/2228
See application file for complete search history.

(56) References Cited

U.S. PATENT DOCUMENTS

| | | | |
|---|---|---|---|
| 5,731,060 A * | 3/1998 | Hirukawa | G03H 1/0256 428/142 |
| 8,651,720 B2 | 2/2014 | Sherman et al. | |
| 8,702,258 B2 | 4/2014 | Toko | |
| 9,551,475 B2 | 1/2017 | Sherman et al. | |
| 2010/0104952 A1* | 4/2010 | Azakami | G03F 7/001 430/2 |
| 2014/0185115 A1* | 7/2014 | An | G02B 17/006 359/19 |
| 2017/0267164 A1* | 9/2017 | Muegge | F21S 43/13 |

FOREIGN PATENT DOCUMENTS

| | | |
|---|---|---|
| EP | 2 492 579 A2 | 8/2012 |
| EP | 2592332 A1 | 5/2013 |
| JP | H09185908 A | 7/1997 |
| JP | H1120567 A | 1/1999 |
| JP | 2003016812 A * | 1/2003 |
| WO | WO2010005810 A2 | 1/2010 |

* cited by examiner

| Rear reflex reflector | | C | | Photometry |
|---|---|---|---|---|
| | | Illumination angles (in degrees) | | |
| Class of reflex reflector | Angle of divergence | V 0°<br>H 0° | ± 10°<br>0° | ± 5°<br>± 20° |
| Ia or Ib | 20' | 300 | 200 | 100 |
| | 1° 30' | 5 | 2,8 | 2,5 |
| IIIa or IIIb | 20' | 450 | 200 | 150 |
| | 1° 30' | 12 | 8 | 8 |

Remarks:
- For China class Ia and IIIa only.
- For India class Ia, Ib and IIa only.
- Values lower than those shown in the last two columns are not permissible within the solid angle having the reference centre as its apex and bounded by the planes intersecting along the following lines: (V = ± 10°, H = 0°) (V = ± 5°, H = ± 20°).
- Values for amber devices in Class IA or IB must be at least multiplied by the coefficient 2.5.
- Values for colourless devices in Class IA or IB must be multiplied by the coefficient 4.
- Evaluation of the effective area with 200 mm measuring circle. The center of the circle is chosen by supplier

Fig. 8

REFLECTOR FOR VEHICLES

This nonprovisional application is a continuation of International Application No. PCT/EP2015/078801, which was filed on Dec. 7, 2015, and which claims priority to German Patent Application No. 10 2014 118 308.8, which was filed in Germany on Dec. 10, 2014, and which are both herein incorporated by reference.

BACKGROUND OF THE INVENTION

Field of the Invention

The invention relates to a reflector for vehicles or other reflecting components and elements, for example, signs or marker devices, comprising a reflective surface that contains an optical element for reflecting light incident on said optical element according to reflection characteristics.

Description of the Background Art

EP 2 492 579 A2, which corresponds to U.S. Pat. No. 8,702,258, discloses an illumination device for vehicles for producing a predetermined light distribution according to a projection principle. This projection headlight comprises a light source, a lens, a cover device, and a hologram element, which is located between the cover device and the light source. The hologram element is made as a volume hologram element, which diffracts light of a predetermined light distribution characteristic. The known illumination device represents an active light system that does not comprise a reflection function.

DE 100 47 209 A1, which is incorporated herein by reference, discloses a reflector for vehicles which is disposed integrated into a lamp housing. The reflector comprises a reflective surface, which is integrated into a covering panel closing the lamp housing. The reflective surface has an optical element for reflecting light which is incident on said optical element from the outside and has a prismatic shape.

Conventional reflectors, however, have the disadvantages that a reflective surface must be relatively large so as to achieve a required reflection values, that the reflector optics are visible very conspicuously, and that the reflector optics disrupt the light distribution for a further light function disposed behind it.

SUMMARY OF THE INVENTION

It is therefore an object of the present invention to refine a reflector further in such a way that predetermined reflection values are effectively fulfilled, whereby the reflector is dimensioned smaller in particular and, moreover, has an inconspicuous appearance and can be transilluminated without being disturbed by a further light function positioned behind it.

To achieve the object, an embodiment of the invention provides that the reflective surface is designed as a hologram element that has a hologram structure such that when the element is illuminated, light is reflected according to reflection characteristics.

According to an embodiment of the invention, the reflective surface is designed as a hologram element that has a hologram structure corresponding to the reflection characteristics. Because the hologram structure is within the range of the light wavelength, the light-directing structures of the hologram element are nearly invisible to the observer.

According to an embodiment of the invention, the hologram element is designed as a volume hologram element by which the light can be diffracted in a defined angle range and spectral range. For example, the volume hologram element can be formed as a film into which flat photopolymers are integrated. Advantageously, the film can be glued or welded onto a lens or attached by ultrasonic welding.

According to an embodiment of the invention, the lens to which the hologram element is applied is a cover plate that seals a lamp housing. Because of the very small optical structures of the hologram element, it is suitable for transillumination without photometric losses or effects.

According to an embodiment of the invention, the hologram element can be attached only at its lateral sides to a holder frame. Because the hologram element in this case is not placed flat on a support, material and weight can be saved as a result.

According to an embodiment of the invention, the hologram element can have a self-adhesive surface on one of its flat sides, so that the hologram element can be applied anywhere to provide the reflection function. In a vehicle, it can be applied to the cover plate of a fully assembled lamp housing or to a body surface or to a bumper surface. Apart from the vehicle, the hologram element can be placed on stationary objects such as, for example, signs, marking devices, driveways, barriers, delineator posts, in the area of underground garages, etc. This results in a space-saving reflection function for protecting or marking objects.

According to an embodiment of the invention, the hologram element can be formed as a single piece or multiple pieces on an additional lens, positioned in the interior of a lamp housing, or on an appropriate holder frame, whereby, for example, a plurality of hologram element segments are offset in steps and arranged parallel to one another within a lamp housing. The result is a step-shaped profile of the hologram element, so that the hologram element can follow the curved shape of the housing or the cover plate of the housing and thereby is always positioned ideally or substantially perpendicular to the incidence of light.

According to an embodiment of the invention, the multipart hologram element can have a number of hologram element segments that are perpendicular or at an angle to one another. A reflector function in a number of different directions is assured in this way. For example, a hologram element, placed on a side facing a side of the vehicle, can extend in the direction of travel of the vehicle so as to form a side marking reflector.

According to an embodiment of the invention, the hologram element has such light information that only spectral light fractions predetermined for the reflection function are reflected. In this way, the hologram element has a filter function which makes it possible that white light is reflected, for example, in a red or orange light color. An additionally colored lens, as is necessary in the case of conventional reflector optics, is not necessary for this purpose.

According to an embodiment of the invention, the hologram element is integrated only partially into a film or support film, whereby the hologram runs according to a pattern. Advantageously, a reflection occurs herewith that simultaneously produces a graphic pattern. This pattern can be a geometric shape or alphanumeric characters or logos or the like.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 8 illustrates example reflection characteristics.

DETAILED DESCRIPTION

Figure 1:
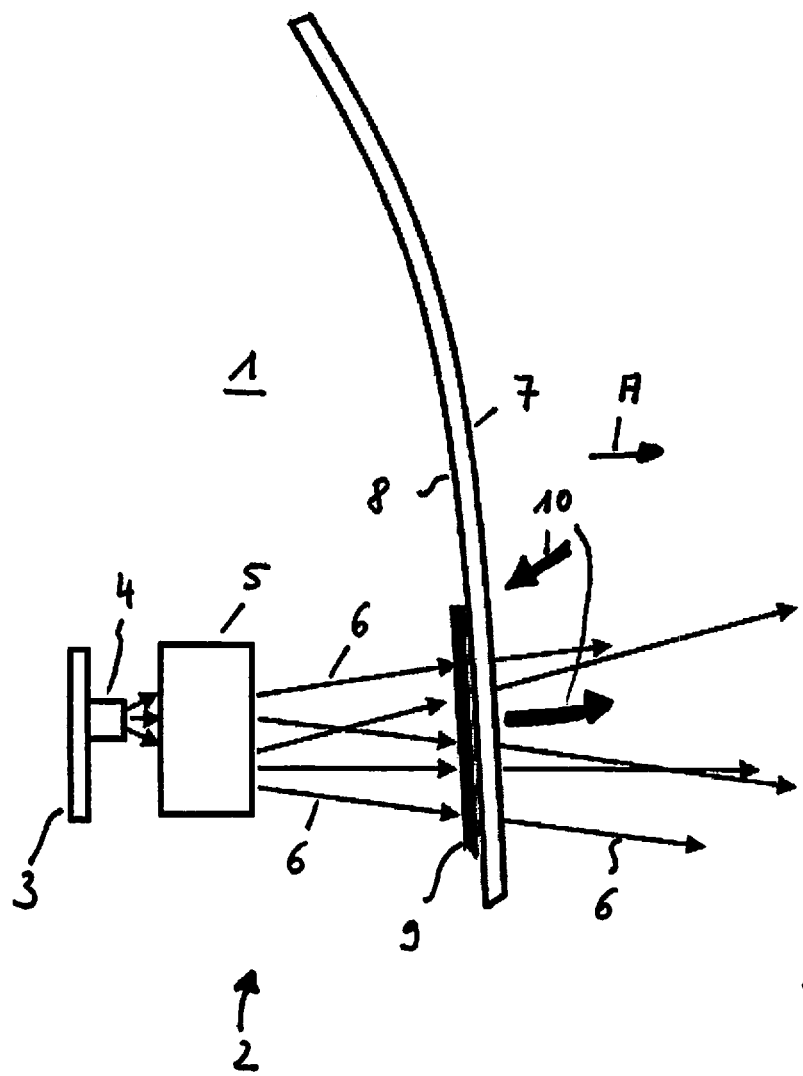
FIG. 1 shows a side view of a reflector, integrated into a lamp housing, according to an embodiment.

A reflector of the invention can be disposed in a lamp housing 1 of a vehicle, which can be made, for example, as a rear light. A lamp unit 2 for producing a predetermined light distribution, for example, a tail light or braking light or turning light function is illustrated schematically in FIG. 1. Lamp unit 2 has a light source 4, which is disposed on a printed circuit board 3 and is formed, for example, as an LED light source. An optical unit 5 having one or more lenses or a reflector is disposed in front of light source 4 in a light emission direction (A). Light 6 emitted by light source 4 is formed or reflected according to a predetermined light distribution by means of optical unit 5. A cover plate 7, which seals lamp housing 1, is provided in front of optical unit 5 in light emission direction A. Cover plate 7 can be made crystal clear, for example. A reflective surface 9, which has a hologram element as an optical element for reflecting light incident on the optical element from the outside according to reflection characteristics, is applied to inner side 8 of cover plate 7.

For example, the reflective holographic element can be used as a rear reflex reflector. In other words, the reflection characteristics correspond to that of, for example, a rear reflex reflector. FIG. 8 illustrates example legal requirements for a rear reflex reflector, which illustrates divergence angles in the second column as well as values of reflected light relative to incident light for different illumination angles in the third to fifth columns.

The hologram element or reflective surface 9 is made as a film, which is applied by gluing or welding, for example, ultrasonic welding, to the inner side (flat side) 8 of cover plate 7. Because hologram element 9 has relatively small hologram structures for diffracting light 6 and the film is transparent, the film or reflective surface 9 is transparent and clear overall. The thus formed hologram film 9 can therefore be disposed in light emission direction A in front of lamp unit 2.

Because the hologram structure of hologram element 9 is formed so that only light 10 incident from the outside is diffracted or reflected, light 6 coming from lamp unit 2 passes through hologram film 9 without diffraction.

Figure 2:
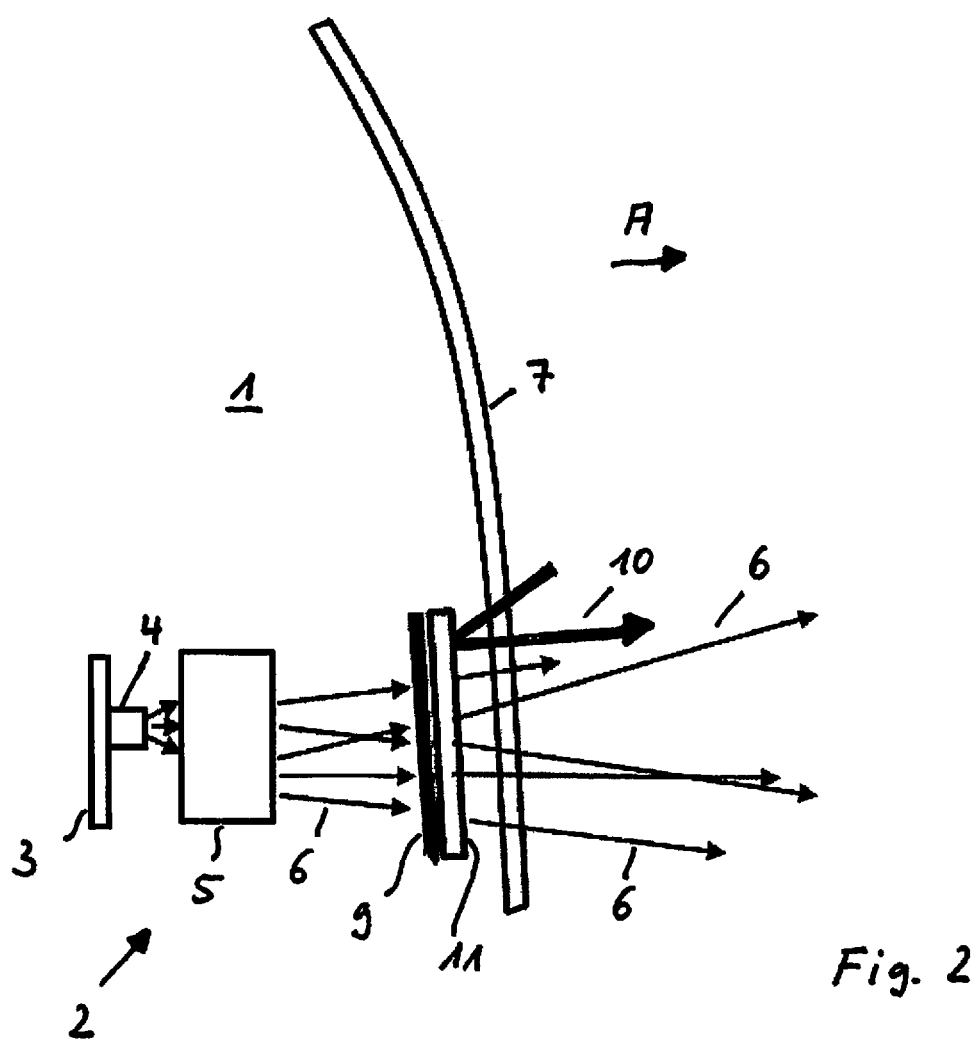
FIG. 2 shows a reflector, integrated into the lamp housing, according to an embodiment.

According to an embodiment of the invention according to FIG. 2, hologram element film 9 can be disposed on an additional lens 11, spaced apart from cover plate 7, within lamp housing 1. Lens 11 is formed transparent and serves only as a support for hologram element film 9.

Hologram element 9 can be made as a holographic optical element (HOE), which falls within the class of diffractive optical elements. In comparison with conventional refractive optical elements, diffractive optical elements are distinguished by considerably smaller optical structures, which diffract light in a limited spectral range. The diffractive optical elements can be made as grating, lens, and mirror beam splitters or combinations thereof.

For example, hologram element 9 can be made as a volume hologram element, which in the exemplary embodiment according to FIGS. 1 and 2 is a volume transmission hologram element. The volume hologram element is made as an emulsion or as a holographic film. The hologram element can be made as a photopolymer in the shape of a film. The volume hologram element is made as a relatively thick hologram, because its grating constant g is always smaller than a thickness d of the film material. The product, which is obtained from the thickness d of the hologram and the employed wavelength λ, is substantially greater than the square of the grating constant g; see the following:

$$\lambda \times d >> g^2$$

Because the grating constant g is relatively small, and lies at most in the range of wavelengths λ of the light, the grating structure is nearly invisible to the human eye. Hologram element 9 therefore appears to be transparent.

Hologram element 9 formed as a film can be preshaped, for example, by deep-drawing, placed in an injection molding tool, and then overmolded by the material of lens 11. Alternatively, hologram element film 9 can also be glued or welded afterwards onto lens 11, for example, by ultrasonic welding.

Light bundle 10 is diffracted on hologram element 9, which is formed as volume hologram element, in a defined, limited angle range and spectral range. As a result, the light-directing structures (grating structure), introduced in the holographic recording medium, are nearly invisible to the observer. Advantageously, hologram element 9 is made as a transparent part, which has no visible optical structures.

Hologram element 9 can be formed as a volume hologram element, by means of which light 10 is diffracted in a defined angle range and spectral range and is again reflected back according to the predetermined reflection characteristics.

Figure 3:
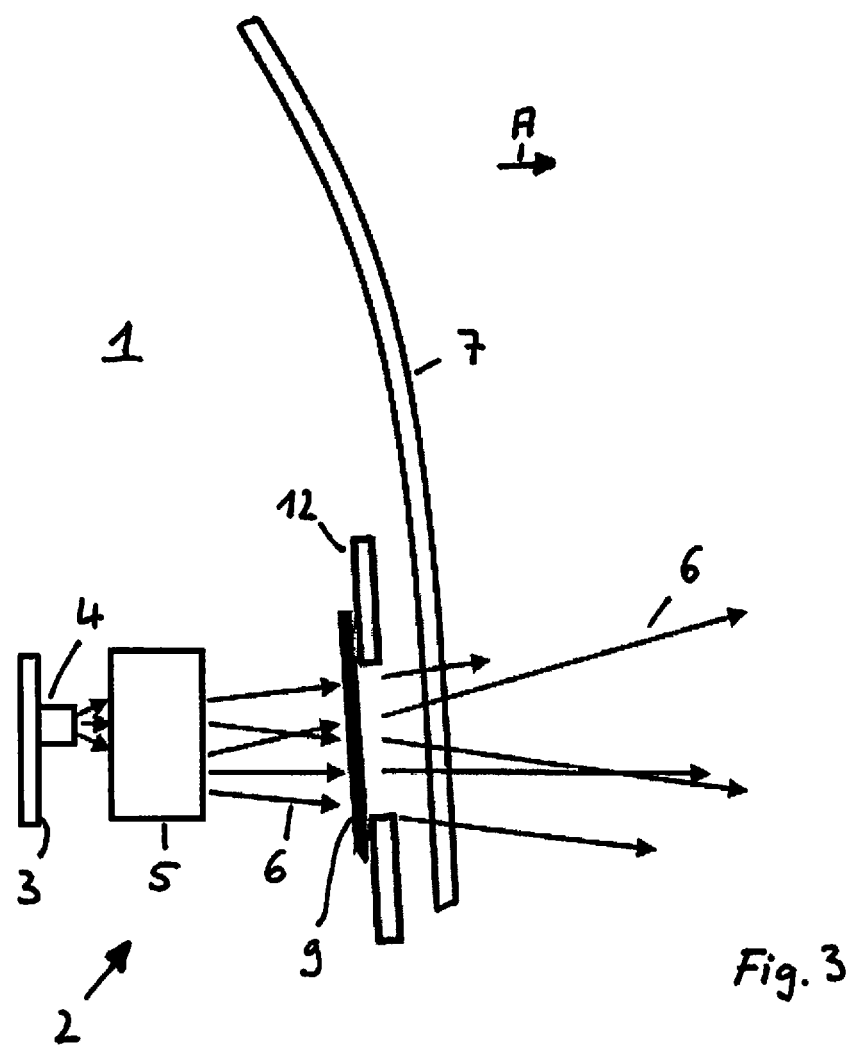
FIG. 3 shows a reflector, integrated into the lamp housing, according to an embodiment.
Figure 4:
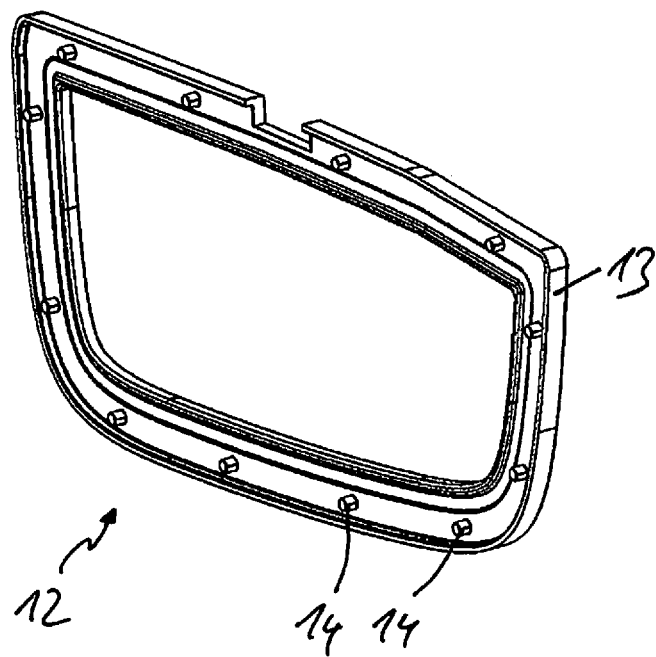
FIG. 4 shows a perspective illustration of a support frame for a hologram element.
Figure 5:
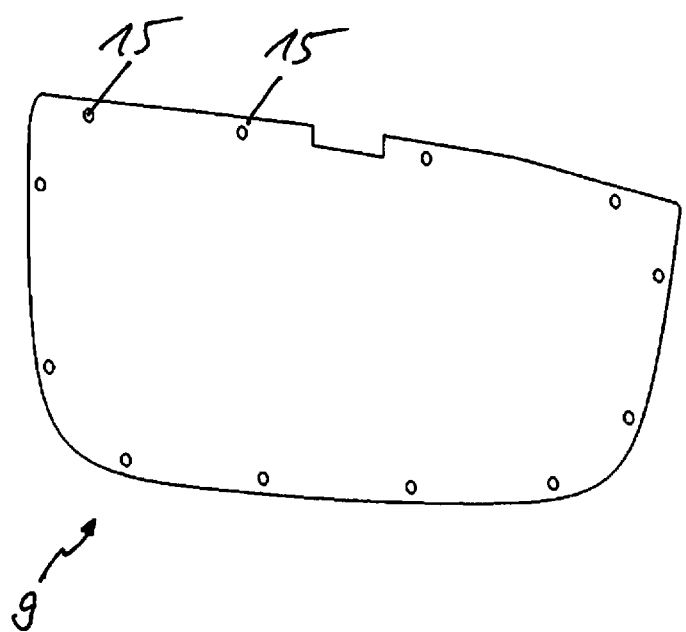
FIG. 5 shows a front view of a film containing the hologram element.

According to an embodiment of the invention, according to FIGS. 3 to 5, hologram film 9 is attached at the edges to a holder frame 12, which is disposed within lamp housing 1, for example, in the vicinity of cover plate 7. Hologram film 9 is attached at a peripheral edge of holder frame 12. For example, holder frame 12 can have at its edge 13 a plurality of rivet pegs 14 arranged in a distributed manner and engaging in corresponding holes 15 of hologram film 9. Alternatively, hologram film 9 can also be attached to holder frame 12 by welding or gluing. Holder frame 12 can have a contour that enables a simple attachment of the frame to an inner side of lamp housing 1.

According to an embodiment of the invention, hologram film 9 can also be disposed on an outer side of cover plate 7 or an outwardly directed side of lens 11. For example, hologram film 9 can be provided on a flat side with a self-adhesive surface, so that hologram film 9 can be attached to the outside of cover plate 7 or a body surface of the vehicle, for example, to a bumper surface. Alternatively, this hologram element film 9 can also be applied in a simple manner to stationary objects, for example, delineator posts, columns or walls of underground garages, barriers, or driveways, so as to mark an object or to protect it from damage.

Figure 6:
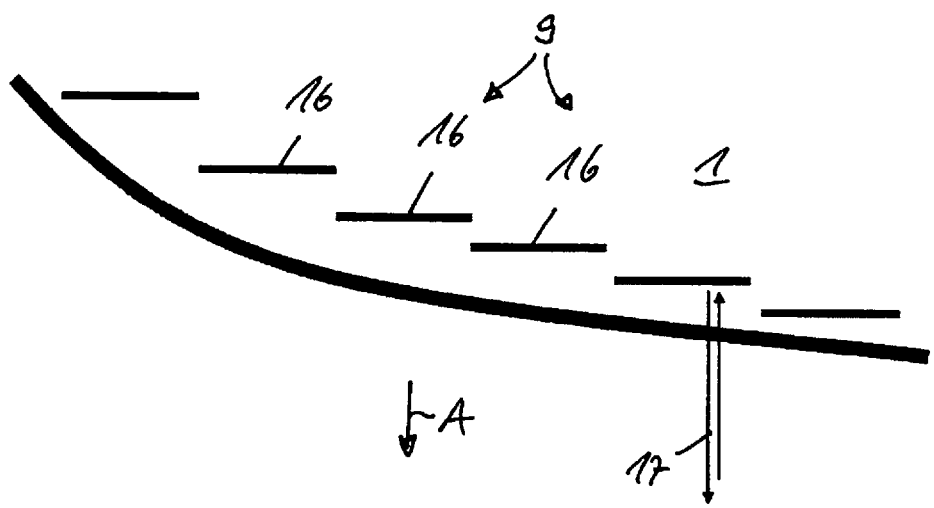
FIG. 6 shows a top plan view of a lamp housing with hologram elements arranged in steps and running parallel to one another.

According to a further embodiment of the invention, according to FIG. 6, hologram film 9 is not formed as a single piece but as multiple pieces. The hologram element or hologram element film 9 has a plurality of hologram element segments 16, which are offset from one another in a light emission direction A. Hologram element segments 16 are arranged parallel to one another and extend in the horizontal direction from one end to the opposite end of lamp housing 1. The hologram element in this way can follow the curved shape of the lamp housing. Hologram element segments 16 are therefore arranged offset to one another stepwise or in a stepped manner. Hologram element segments 16, as described above, are integrated into a film 9 and attached to a holder frame 12 or to a lens 11.

Figure 7:
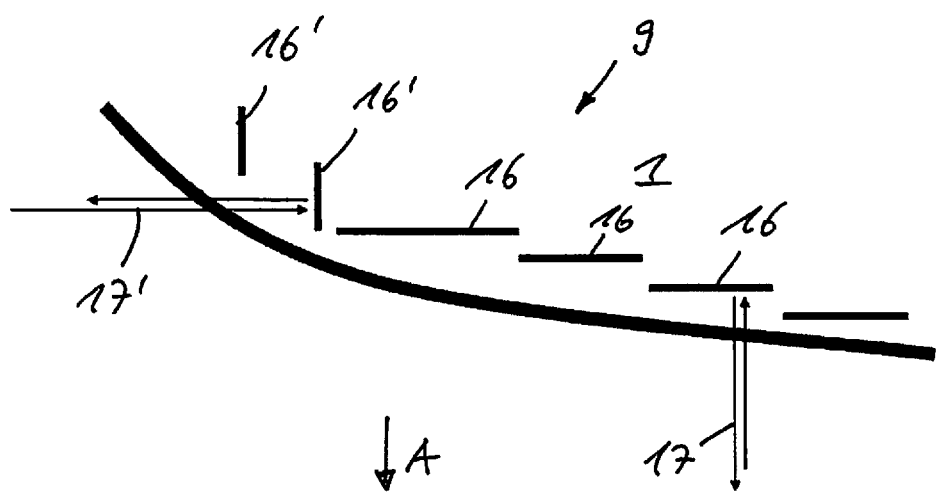
FIG. 7 shows a top plan view of a lamp housing with a number of hologram element segments running perpendicular to one another.

According to a further embodiment of the invention according to FIG. 7, a number of hologram element segments 16', facing a side of the vehicle, are arranged oriented toward the side, so that light 17' incident from a side is reflected toward the side (side marker reflectors). In the present exemplary embodiment, hologram element segments 16' are arranged substantially perpendicular to the other hologram segments 16; i.e., they are arranged running in the light emission direction A. Optionally, hologram element segments 16' can also be positioned inclined to the light emission direction A. The parallel hologram element segments 16 are arranged substantially perpendicular to light emission direction A and enable the reflection of light 17 incident in light emission direction A.

Hologram element segments 16 enable the reflection of light 17 incident in light emission direction A, so that when lamp housing 1 is designed as a rear light, the vehicle is marked for road users located behind the vehicle. The reflector arrangement according to FIG. 7 enables a reflection in a widened angle range, which is at least 90°.

According to a further embodiment of the invention, hologram element 9 has such light information that only spectral light fractions predetermined for the reflective light function are reflected. In this way, the reflector can reflect light in a desired color. For example, hologram element 9 can be designed such that upon the incidence of white light on the hologram element, red or orange light is reflected. Advantageously, in this embodiment cover plate 7 or lens 11 need not be colored. The thus formed hologram film 9 has a red or orange color for an observer.

According to a further embodiment of the invention (not shown), hologram element 9 can also be integrated only partially into a film. The incident light is reflected or retroreflected only in the areas of the film in which hologram element 9 is provided. It passes through in the other area. Hologram element 9 can be arranged in the film according to a pattern, so that only the pattern lights up upon illumination of the film. For example, the pattern can be formed as a striped pattern or any graphical pattern and/or by alphanumeric signs or symbols. Advantageously, in the case of this reflector only defined areas of the film light up, namely, only areas defined by hologram element 9. Film 9 therefore has only a partial holographic structure.

It is understood that the aforementioned features can be used separately or as a number of features in any combination. The described exemplary embodiments are not to be understood as an exhaustive list but rather as having an illustrative nature in order to describe the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A reflector for a vehicle, the reflector comprising:
a reflective surface that contains an optical element to reflect light incident on the optical element according to reflection characteristics, the reflective surface being configured as a hologram element that has a hologram structure such that when the optical element is illuminated, light is reflected according to the reflection characteristics,
wherein the hologram element is formed as a film, which is attached at edges to a holder frame, the holder frame being disposed in an interior of a lamp housing, the hologram element being a volume hologram element in which a grating constant g is smaller than a thickness of the film,
wherein a lamp unit is disposed in the lamp housing for producing a light function,
wherein the holder frame forms a substrate for a first side of the hologram element,
wherein a second side of the hologram element, that opposes the first side, is exposed to an interior of the lamp housing and faces the lamp unit, such that the hologram element is a first element inside of the lamp housing that is passed through by a light bundle emitted by the lamp unit, and
wherein the light bundle emitted by the lamp unit passes through the hologram element before passing through the holder frame.

2. The reflector according to claim 1, wherein the hologram element is the volume hologram element via which the light is diffracted in a defined angle range and a spectral range of the light so that the reflection characteristics with respect to a reflection distribution and reflection intensity for a reflection function on the vehicle are fulfilled.

3. The reflector according to claim 1, wherein the hologram element contains such light information that only spectral light fractions predetermined for a reflection function are reflected.

4. The reflector according to claim 1, wherein the hologram element is introduced into a film according to a pattern, so that upon illumination of the film only the pattern lights up.

5. The reflector according to claim 1, wherein the holder frame is spaced apart from a cover plate that seals the lamp housing.

* * * * *